Aug. 31, 1926.
W. V. VAN ETTEN
1,598,330
DIRIGIBLE HEADLIGHT
Filed Nov. 1, 1924
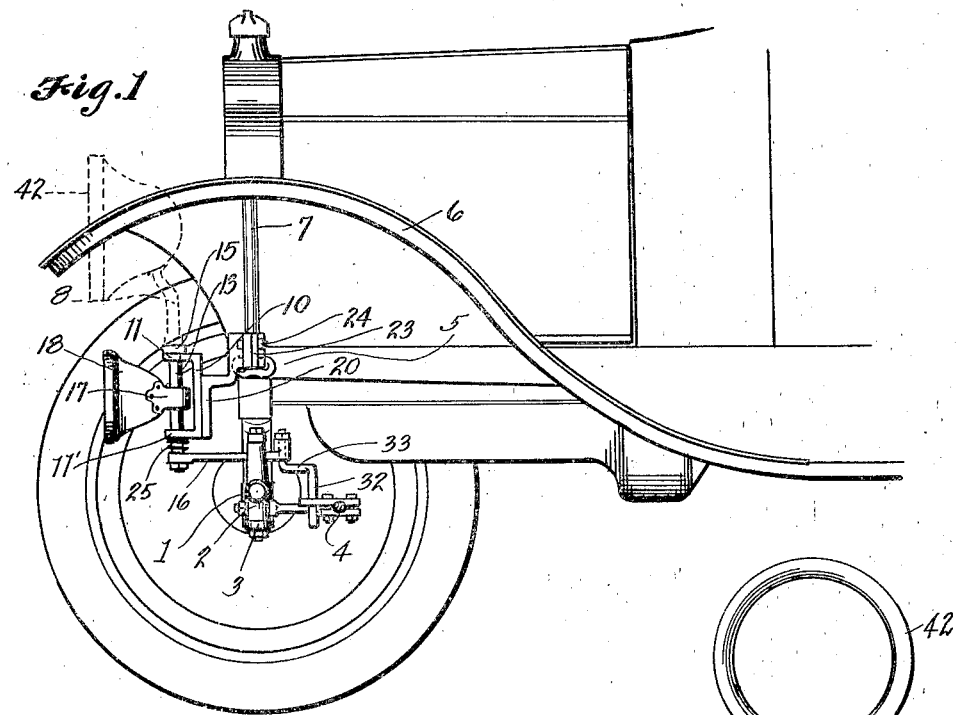
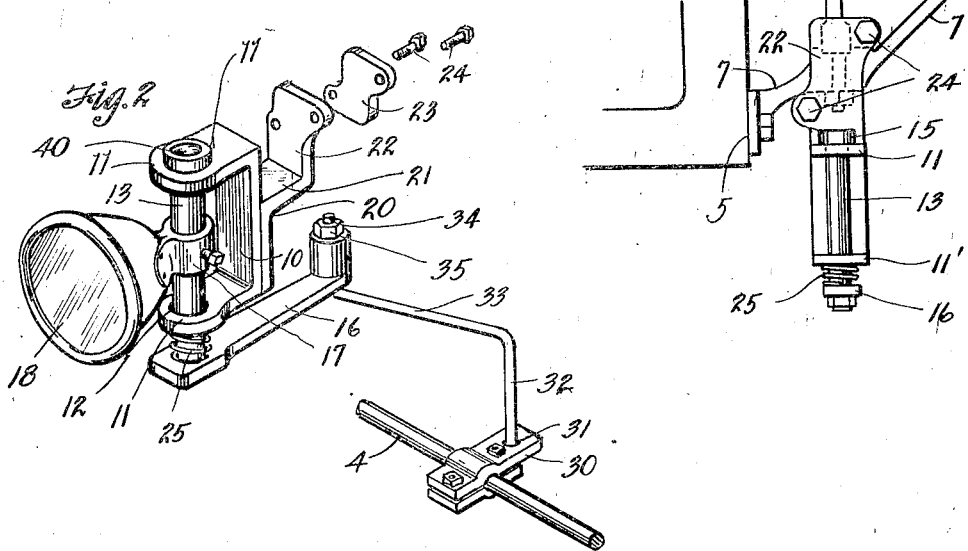
INVENTOR
WILLIAM V. VAN ETTEN
BY
Richard J. Cook
ATTORNEY Patented Aug. 31, 1926.

1,598,330

UNITED STATES PATENT OFFICE.

WILLIAM V. VAN ETTEN, OF EVERETT, WASHINGTON.

DIRIGIBLE HEADLIGHT.

Application filed November 1, 1924. Serial No. 747,266.

This invention relates to improvements in headlights, or spotlights, for motor vehicles and more particularly to dirigible headlights that are adapted to be operated under the control of the vehicle's steering mechanism in such manner that the light therefrom will be made to follow the roadway as the vehicle turns from side to side.

It is the principal object of the invention to provide a dirigible headlight, or spotlight, especially for Ford automobiles, but also applicable to other makes of cars, adapted to be mounted on a fender supporting bracket at the front of the vehicle and operated by connection with the steering knuckle connecting rod.

It is a further object to provide a device as above stated that may be installed without necessitating any changes in the arrangement or any alteration of parts of the vehicle as they ordinarily exist.

Other objects reside in the details of construction and combination of parts as hereinafter described.

In accomplishing these and other objects of the invention, I have provided the improved details of construction, the preferred forms of which are illustrated in the accompanying drawings, wherein—

Figure 1 is a side elevaton of the forward part of an automobile equipped with a dirigible headlight in accordance with the present invention; the near wheel of the car being removed for the purpose of better illustration.

Figure 2 is a perspective view of the parts disconnected from the vehicle.

Figure 3 is a front view of a part of the vehicle showing the place of attachment of the lamp mounting.

Referring more in detail to the drawings—

1 designates the front axle of an automobile, 2 a steering knuckle that is pivotally mounted in a yoke 3 at the end of the axle and 4 a steering knuckle connecting rod by means of which the front wheels of the vehicle are turned from side to side.

Secured to the side beam 5 of the frame of the car is the usual fender 6 supported by a brace rod 7 that is fixed at its lower end to the frame and at its upper end to the under side of the fender. This brace, in Ford automobiles, serves as a support for a headlight mounting standard 8, as shown in Figure 3, that is threaded into a vertical bore provided in the bar near its lower end.

Secured to the brace rod 7 is a mounting bracket for the dirigible headlight; the bracket comprising a flat, vertically disposed bar 10 with forwardly turned upper and lower end portions 11—11' provided with openings 12 within which a shaft 13 is rotatably contained. At its upper end the shaft has a supporting head or shoulder 15 and at its lower end has a rearwardly extending lever arm 16 fixed thereto. Secured in the shaft 13 between the mounting portions of the bracket is a collar 17 that supports a spotlight 18 of any suitable or desirable type.

The plate 10 is rigidly mounted by means of a bracket 20 that is fixed thereto and to the fender brace rod 7; the bracket 20, for this purpose, having a rearwardly extending portion 21 with an upturned end 22 adapted to engage with the forward side of the brace rod 7 and to be secured thereto by means of a clamping plate 23 adapted to seat against the opposite side of the rod and to be secured by bolts 24 to the end 22.

A coiled spring 25 is located about the lower end of shaft 13 to bear against the lower end of the supporting plate and the lever arm 16 to serve as a tensioning means for eliminating vibration of the shaft and thus avoid flicking of the light.

Secured to the knuckle connecting rod 4 is a plate 30 having an aperture 31 therethrough and extended slidably through this aperture is the vertical, downturned end portion 32 of a link, or rod 33, which at its other end has a vertically turned end 34 journaled in the swinging end of lever 16 and secured by a nut 35. This connection provides that movement of the connecting rod 4 incidental to steering of the vehicle effects rotative movement of shaft 13 and the swinging of the spotlight so that its rays will follow the roadway.

In the upper end of the shaft 13 I have provided a bore 40 and into this the standard 8 of the headlight 42 may be threaded. Ordinarily this latter headlight is supported by the bracket 7 and is not dirigible, and it is optional whether it be mounted in shaft 13 or left in the usual place.

Having thus described my invention, what I claim as new therein and desire to secure by Letters-Patent, is:—

In a vehicle of the class described having a steering knuckle connecting rod and a fender supporting brace rod fixed to the forward end of the frame, of a lamp mounting bracket rigidly mounted on the said brace rod comprising a vertical plate having forwardly turned upper and lower end portions, a lamp mounting shaft rotatable in said ends, a spot light mounted on the shaft, a lever arm fixed to the lower end of the shaft and a link pivotally fixed to the end of said lever arm and to the steering knuckle connecting rod and adapted to move vertically in its connection with the steering knuckle rod.

Signed at Seattle, King County, Washington, this 23rd day of October, 1924.

WILLIAM V. VAN ETTEN.